(12) United States Patent
Lee

(10) Patent No.: US 11,440,368 B2
(45) Date of Patent: Sep. 13, 2022

(54) DAMPER CONTROL SYSTEM AND METHOD ACCORDING TO ROUGH ROAD DETERMINATION

(71) Applicants: Hyundai Motor Company, Seoul (KR); Kia Motors Corporation, Seoul (KR)

(72) Inventor: Min Su Lee, Whasung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 428 days.

(21) Appl. No.: 16/683,745

(22) Filed: Nov. 14, 2019

(65) Prior Publication Data

US 2021/0008946 A1    Jan. 14, 2021

(30) Foreign Application Priority Data

Jul. 8, 2019 (KR) .................... 10-2019-0082313

(51) Int. Cl.
*B60G 17/0165*    (2006.01)
(52) U.S. Cl.
CPC .. *B60G 17/0165* (2013.01); *B60G 2400/0521* (2013.01); *B60G 2400/0522* (2013.01); *B60G 2400/102* (2013.01); *B60G 2400/82* (2013.01)

(58) Field of Classification Search
None
See application file for complete search history.

(56) References Cited

U.S. PATENT DOCUMENTS

| | | | | |
|---|---|---|---|---|
| 6,000,702 A | * | 12/1999 | Streiter | B60G 17/016 280/5.514 |
| 2006/0163863 A1 | * | 7/2006 | Ellmann | B60G 15/063 280/124.179 |
| 2006/0181034 A1 | * | 8/2006 | Wilde | B60G 15/12 280/124.16 |
| 2020/0180382 A1 | * | 6/2020 | Lee | B60G 17/06 |

FOREIGN PATENT DOCUMENTS

KR    10-2009-0094509 A    9/2009

* cited by examiner

*Primary Examiner* — Navid Z. Mehdizadeh
(74) *Attorney, Agent, or Firm* — Morgan, Lewis & Bockius LLP

(57) ABSTRACT

Disclosed herein are a damper control system and method according to rough road determination in which the number of sensors is reduced and a state of a road surface is subdivided and determined by a 6D sensor since an existing wheel G sensor is not used at the time of determining the state of the road surface.

11 Claims, 3 Drawing Sheets

DAMPER CONTROL SYSTEM AND METHOD ACCORDING TO ROUGH ROAD DETERMINATION

CROSS REFERENCE TO RELATED APPLICATION

The present application claims priority to Korean Patent Application No. 10-2019-0082313, filed Jul. 8, 2019, the entire contents of which is incorporated herein for all purposes by this reference.

BACKGROUND OF THE INVENTION

Field of the Invention

The present invention relates to a damper control system and method according to rough road determination for grasping a state of a road surface on which a vehicle is traveling.

Description of Related Art

Recently, an electric control suspension (ECS) for improving riding comfort by controlling a damper as opposed to a relative velocity of the suspension according to the relative velocity of the suspension to minimize a vertical movement of a vehicle body (sprung mass) has been used.

An ECS according to the related art includes four dampers providing damping force between a vehicle body and wheels, an electronic control unit (ECU) for controlling the dampers, a vehicle body sensor for determining a vertical velocity of the vehicle body, and a wheel sensor for determining a vertical velocity of the wheels.

In the instant case, sensors are mounted on three of four corners of the vehicle body, and sensors are mounted on two front wheels of the wheels, such that a total of five sensors are required. Furthermore, the sensors mounted on the wheels are used to grasp a state of a road surface.

However, the sensors mounted on the vehicle body and the wheels are expensive, and a weight is increased due to the mounting of the sensors, which has a negative influence on fuel efficiency.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a damper control system and method according to rough road determination for determining a state of a road surface on which a vehicle is traveling without using a wheel G sensor at the time of determining the state of the road surface.

According to an exemplary embodiment of the present invention, a damper control system according to rough road determination of a vehicle includes: a sensing unit configured for detecting vehicle posture information depending on a vertical acceleration, a roll rate, and a pitch rate of a vehicle body in the vehicle; a first deriving unit coupled to the sensing unit and configured of receiving the vertical acceleration detected by the sensing unit and deriving impact force generated in the vehicle body; a second deriving unit coupled to the first deriving unit and configured of receiving the vertical acceleration, the roll rate, and the pitch rate detected by the sensing unit and deriving impact energy generated in the vehicle body; an estimating unit coupled to the second deriving unit and configured of pre-storing road surface data depending on impact force and impact energy and of estimating a state of a road surface depending on the impact force and the impact energy each input from the first deriving unit and the second deriving unit; and a controller coupled to the estimating unit and configured of controlling a damper depending on the estimated state of the road surface.

The sensing unit may detect the vertical acceleration, the roll rate, and the pitch rate of the vehicle body by a 6D sensor.

The first deriving unit may derive the impact force using the vertical acceleration received from the sensing unit and weight information.

The second deriving unit may derive a vertical velocity using the vertical acceleration, derive a roll velocity using the roll rate, derive a pitch velocity using the pitch rate, and derive the impact energy using any one of the vertical velocity, the roll velocity, and the pitch velocity.

The second deriving unit may convert the vertical velocity, the roll velocity, and the pitch velocity into square forms, and then derive the impact energy using a highest velocity of the converted vertical, roll and pitch velocities.

In the road surface data of the estimating unit, a force reference value set so that a rough road level is divided depending on the impact force and an energy reference value set so that the rough road level is divided depending on the impact energy may be pre-stored, and the state of the road surface may be classified depending on whether or not the impact force reaches the force reference value and whether or not the impact energy reaches the energy reference value.

According to various exemplary embodiments of the present invention, a damper control method according to rough road determination of a vehicle includes: a detecting step of detecting vehicle posture information depending on a vertical acceleration, a roll rate, and a pitch rate of a vehicle body in the vehicle; a first deriving step of receiving the vertical acceleration detected in the detecting step and deriving impact force generated in the vehicle body; a second deriving step of receiving the vertical acceleration, the roll rate, and the pitch rate detected in the detecting step and deriving impact energy generated in the vehicle body; an estimating step of pre-storing road surface data depending on impact force and impact energy and of estimating a state of a road surface depending on the received impact force and impact energy; and a controlling step of controlling, by a controller, a damper depending on the estimated state of the road surface.

In the first deriving step, the impact force may be derived using the vertical acceleration received from the detecting step and weight information.

In the second driving step, a vertical velocity may be derived using the vertical acceleration, a roll velocity may be derived using the roll rate, a pitch velocity may be derived using the pitch rate, and the impact energy may be derived using a highest velocity of the vertical velocity, the roll velocity, and the pitch velocity.

In the road surface data of the estimating step, a force reference value set so that a rough road level is divided depending on the impact force and an energy reference value set so that the rough road level is divided depending on the impact energy may be pre-stored, and the state of the road surface may be classified depending on whether or not the impact force reaches the force reference value and whether or not the impact energy reaches the energy reference value.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
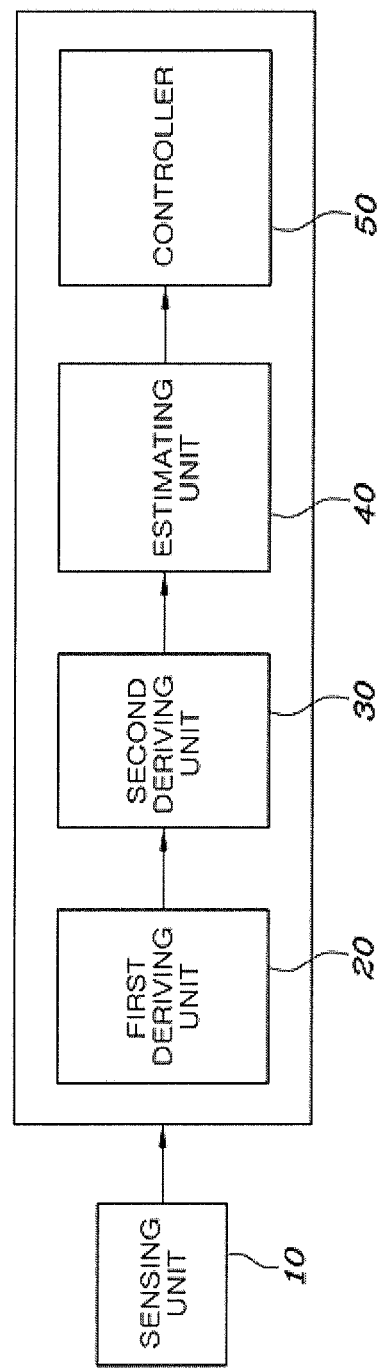
FIG. 1 is a schematic diagram of a damper control system according to rough road determination according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a damper control system and method according to rough road determination according to an exemplary embodiment of the present invention will be described with reference to the accompanying drawings.

Figure 2:
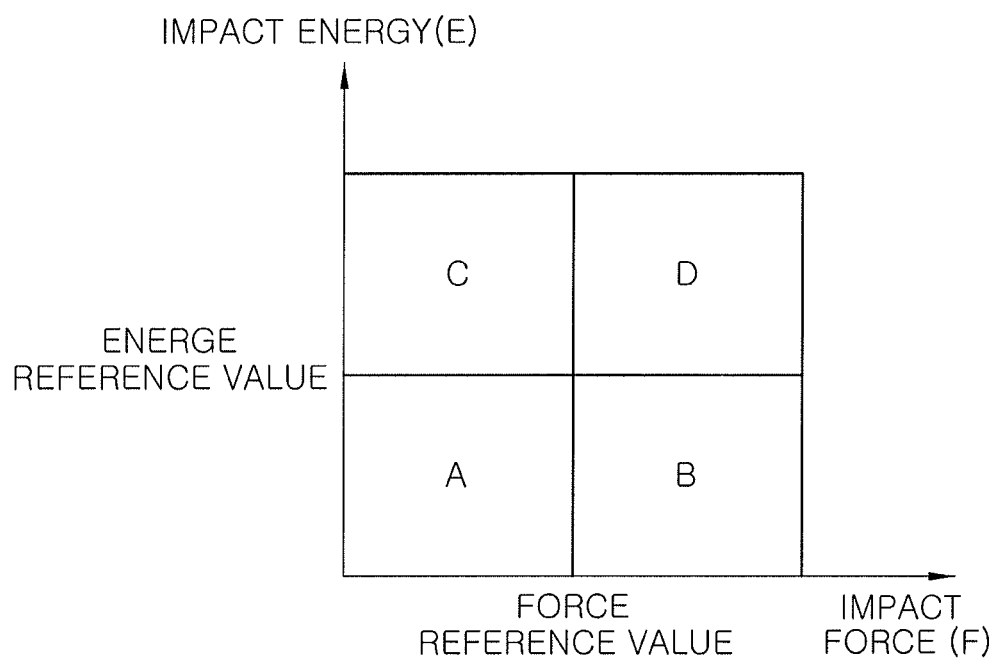
FIG. 2 is a view for describing the damper control system according to the rough road determination illustrated in FIG. 1.
Figure 3:
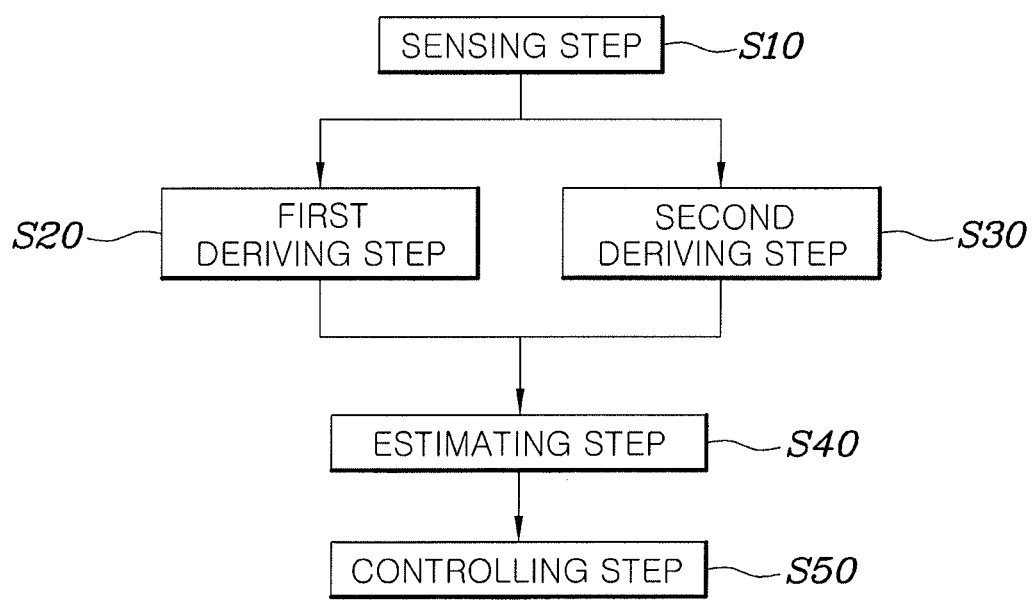
FIG. 3 and FIG. 4 are flowcharts illustrating a damper control method according to rough road determination according to an exemplary embodiment of the present invention.
Figure 4:
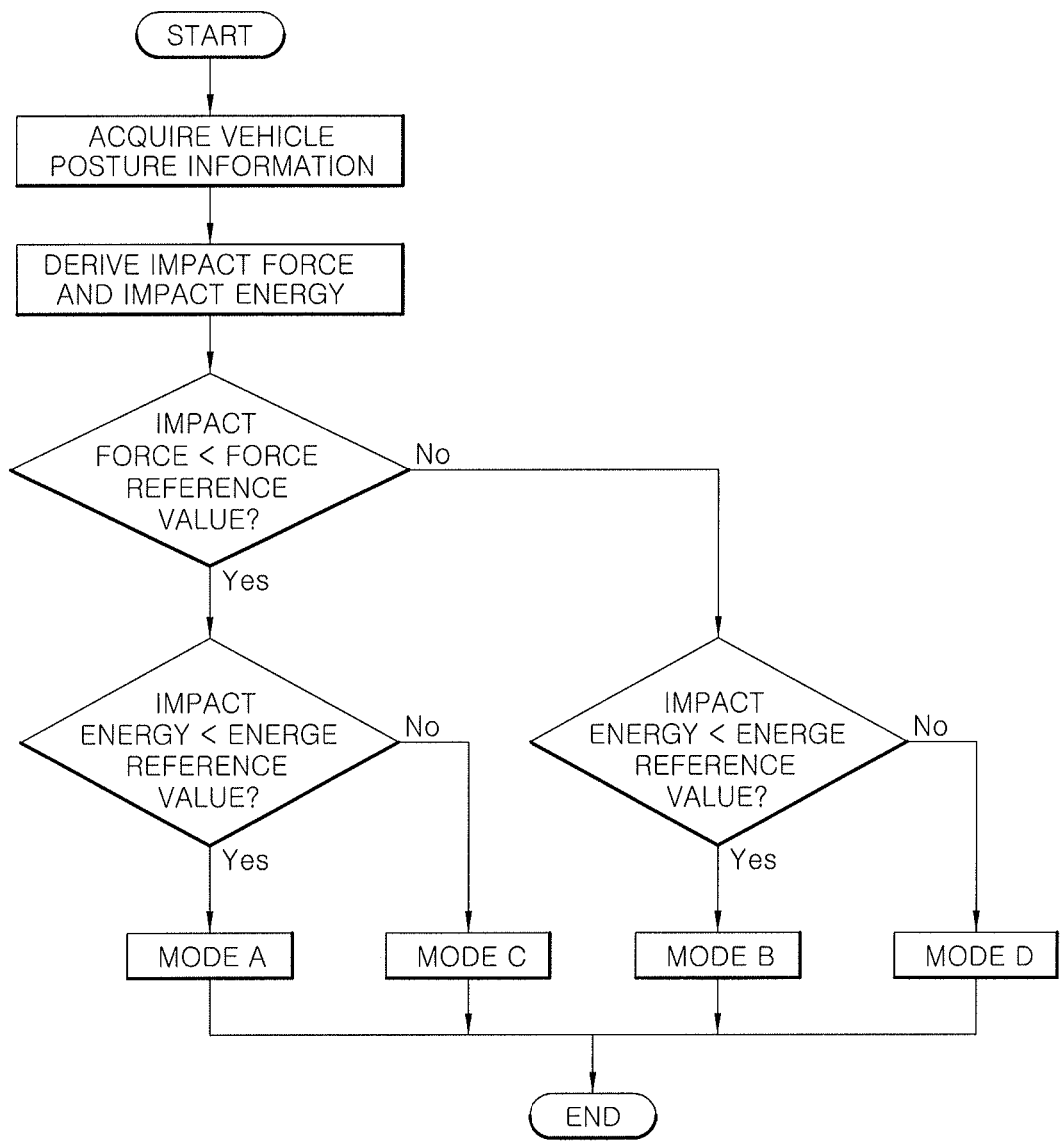

FIG. 1 is a schematic diagram of a damper control system according to rough road determination according to an exemplary embodiment of the present invention, FIG. 2 is a view for describing the damper control system according to the rough road determination illustrated in FIG. 1, and FIG. 3 and FIG. 4 are flowcharts illustrating a damper control method according to rough road determination according to an exemplary embodiment of the present invention.

The damper control system according to rough road determination according to an exemplary embodiment of the present invention includes a sensing unit 10 detecting vehicle posture information depending on a vertical acceleration, a roll rate, and a pitch rate of a vehicle body in the vehicle; a first deriving unit 20 receiving the vertical acceleration detected by the sensing unit 10 and deriving impact force generated in the vehicle body; a second deriving unit 30 receiving the vertical acceleration, the roll rate, and the pitch rate detected by the sensing unit 10 and deriving impact energy generated in the vehicle body; an estimating unit 40 pre-storing road surface data depending on impact force and impact energy and of estimating a state of a road surface depending on the impact force and the impact energy each input from the first deriving unit 20 and the second deriving unit 30; and a controller 50 controlling a damper depending on the estimated state of the road surface, as illustrated in FIG. 1.

As described above, the damper control system according to rough road determination according to an exemplary embodiment of the present invention includes the sensing unit 10, the first deriving unit 20, the second deriving unit 30, the estimating unit 40, and the controller 50. That is, the first deriving unit 20 and the second deriving unit 30 derive the impact force and the impact energy, respectively, using the vehicle posture information detected through the sensing unit 10, and the estimating unit 40 estimates the state of the road surface using the derived impact force and impact energy. Accordingly, damper control through an electric control suspension (ECS) is performed depending on the estimated state of the road surface.

Here, the sensing unit 10 acquires the vehicle posture information depending on a vehicle posture by a 6D sensor, and the vehicle posture information is the vertical acceleration, the roll rate, and the pitch rate of the vehicle body. Accordingly, the sensing unit 10 detects the vertical acceleration, the roll rate, and the pitch rate of the vehicle body and transfers the corresponding information to the first deriving unit 20 and the second deriving unit 30, such that the impact force is derived by the first deriving unit 20 and the impact energy is derived by the second deriving unit 30. That is, the state of the road surface may be classified by converting a road surface input influence generated during traveling of a vehicle into the impact force and the impact energy.

In detail, the first deriving unit 20 may derive the impact force using the vertical acceleration received from the sensing unit 10 and weight information. Here, the impact force is force at which the vehicle behaves in a vertical direction thereof, and is force applied to the vehicle in a short time. Since such a short time period does not have a large influence on the behavior of the vehicle, but impact feeling is transferred to a driver, the impact force is derived. The impact force may be derived on the basis of F=m*a (here, m is a weight of a vehicle and a is a vertical acceleration). The weight information is predetermined as a vehicle specification, the vertical acceleration is derived through the sensing unit 10, and the impact force may be derived using the weight information and the vertical acceleration. Accordingly, a difference of the impact force derived through the first deriving unit 20 may be maximized by converting the vertical acceleration into a square form to subdivide the state of the road surface classified through the estimating unit 40.

Meanwhile, the second deriving unit 30 may derive a vertical velocity using the vertical acceleration, derive a roll velocity using the roll rate, derive a pitch velocity using the pitch rate, and derive the impact energy using any one of the vertical velocity, the roll velocity, and the pitch velocity. Here, the impact energy is kinetic energy of the road surface having an influence on the vehicle as the vehicle behaves in front and rear directions and left and right directions.

The impact energy may be derived on the basis of $E=m*v^2$ (here, m is a weight of a vehicle and v is a vertical velocity), and each impact energy depending on the vertical velocity, the roll velocity, and the pitch velocity may be derived.

To the present end, the vertical velocity may be derived by integrating the vertical acceleration detected through the sensing unit 10, the roll velocity may be derived through a multiplication between the roll rate detected through the sensing unit 10 and a rear wheel tread, and the pitch velocity may be derived through a multiplication between the pitch rate and a wheelbase. Kinetic energy depending on a behavior direction of the vehicle may be derived by converting the vertical velocity, the roll velocity, and the pitch velocity into square forms and then deriving the impact energy using the highest velocity of the converted vertical, roll and pitch velocities.

Accordingly, when the impact force and the impact energy each derived through the first deriving unit 20 and the second deriving unit 30 are input to the estimating unit 40, the estimating unit 40 estimates the state of the road surface on the basis of the road surface data. Here, in the road surface data of the estimating unit 40, a force reference value set so that a rough road level is divided depending on the impact force and an energy reference value set so that the rough road level is divided depending on the impact energy are pre-stored, and the state of the road surface may be classified depending on whether or not the impact force reaches the force reference value and whether or not the impact energy reaches the energy reference value. Here, the force reference value and the energy reference value, which are values determined depending on an acceleration and a vehicle motion instantaneously generated in the vehicle body as the vehicle passes through a protrusion section of the road surface, and are data predetermined through an experiment.

As an example, referring to FIG. 2, the road surface data may divide a section of the road surface into a plurality of modes depending on whether or not the impact force reaches the force reference value and whether or not the impact energy reaches the energy reference value.

Here, mode A of FIG. 2, which is a road surface on which a comparative small acceleration and vehicle motion are generated since the impact force does not reach the force reference value and the impact energy does not reach the energy reference value, is determined to be a general flat road.

Mode B which is a road surface on which a vehicle motion is small, but a large acceleration is generated in the vehicle body since the impact force is the force reference value or more and the impact energy does not reach the energy reference value, is determined to be a road on which a speed bump whose width is small, but height is large exists.

Mode C is a road surface on which a small impact is generated with a small acceleration, but a large vehicle motion is generated since the impact force does not reach the force reference value and the impact energy is the energy reference value or more. Mode C is determined to be a state of a road surface in which a strong sky hook control is required.

Mode D is recognized as a road surface on which a large vehicle motion and acceleration are generated since the impact force is the force reference value or more and the impact energy is the energy reference value or more.

As described above, the state of the road surface is grasped depending on the impact force and the impact energy on the basis of the road surface data of the estimating unit 40, such that the controller 50 may control the damper depending on the state of the road surface on which the vehicle is traveling, using the vertical acceleration detected by the 6D sensor.

In the damper control system and method according to rough road determination configured in the structure as described above, an existing wheel G sensor is not used at the time of determining the state of the road surface, such that the number of sensors is reduced, and the state of the road surface is subdivided and determined by the 6D sensor.

Meanwhile, a damper control method according to rough road determination includes a detecting step S10 of detecting the vehicle posture information depending on the vertical acceleration, the roll rate, and the pitch rate of the vehicle body; a first deriving step S20 of receiving the vertical acceleration detected in the detecting step S10 and deriving the impact force generated in the vehicle body; a second deriving step S30 of receiving the vertical acceleration, the roll rate, and the pitch rate detected in the detecting step S10 and deriving the impact energy generated in the vehicle body; an estimating step S40 of pre-storing the road surface data depending on the impact force and the impact energy and of estimating the state of the road surface depending on the received impact force and impact energy; and a controlling step S50 of controlling the damper depending on the estimated state of the road surface, as illustrated in FIGS. 3 and 4.

Here, in the first deriving step S20, the impact force may be derived using the vertical acceleration received from the detecting step S10 and the pre-stored weight information. Furthermore, in the second deriving step S30, the vertical velocity may be derived using the vertical acceleration, the roll velocity may be derived using the roll rate, the pitch velocity may be derived using the pitch rate, and the impact energy may be derived using the highest velocity of the vertical velocity, the roll velocity, and the pitch velocity.

Meanwhile, in the road surface data of the estimating step S40, the force reference value set so that the rough road level is divided depending on the impact force and the energy reference value set so that the rough road level is divided depending on the impact energy are pre-stored, and the state of the road surface may be classified depending on whether or not the impact force reaches the force reference value and whether or not the impact energy reaches the energy reference value.

That is, information depending on the vehicle posture information is collected through the detecting step S10, the impact force is derived using the information depending on the vehicle posture information through the first deriving step S20, and the impact energy is derived using the information depending on the vehicle posture information through the second deriving step S30. Accordingly, the state of the road surface is estimated using information depending on the impact force and the impact energy through the estimating step S40. Accordingly, the damper control through the ECS is performed on the basis of the estimated state of the road surface in the controlling step S50.

Here, the vehicle posture information may be collected through the 6D sensor, and is the vertical acceleration, the roll rate, and the pitch rate of the vehicle body. Accordingly, the 6D sensor detects the vertical acceleration, the roll rate, and the pitch rate of the vehicle body, and the impact force and the impact energy are derived using the corresponding information. Accordingly, the state of the road surface may be classified by converting the road surface input influence generated during the traveling of the vehicle into the impact force and the impact energy.

Therefore, the existing wheel G sensor is not used at the time of determining the state of the road surface, such that the number of sensors is reduced, and the state of the road surface is subdivided and determined by the 6D sensor.

In the damper control system and method according to rough road determination configured in the structure as described above, the existing wheel G sensor is not used at the time of determining the state of the road surface, such that the number of sensors is reduced, and the state of the road surface is subdivided and determined by the 6D sensor.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A damper control system according to rough road determination for a vehicle, the damper control system comprising:
    a sensing unit configured for detecting vehicle posture information depending on a vertical acceleration, a roll rate, and a pitch rate of a vehicle body in the vehicle;
    a first deriving unit coupled to the sensing unit and configured for receiving the vertical acceleration detected by the sensing unit and deriving impact force generated in the vehicle body;
    a second deriving unit coupled to the first deriving unit and configured for receiving the vertical acceleration, the roll rate, and the pitch rate detected by the sensing unit and of deriving impact energy generated in the vehicle body;
    an estimating unit coupled to the second deriving unit and configured for pre-storing road surface data depending on impact force and impact energy and of estimating a state of a road surface depending on the impact force and the impact energy each input from the first deriving unit and the second deriving unit; and
    a controller coupled to the estimating unit and configured for controlling a damper depending on the estimated state of the road surface.

2. The damper control system of claim 1,
    wherein the sensing unit includes a 6D sensor configured to detect the vertical acceleration, the roll rate, and the pitch rate of the vehicle body.

3. The damper control system of claim 1,
    wherein the first deriving unit derives the impact force using the vertical acceleration received from the sensing unit and weight information.

4. The damper control system of claim 1,
    wherein the second deriving unit derives a vertical velocity using the vertical acceleration, derives a roll velocity using the roll rate, derives a pitch velocity using the pitch rate, and derives the impact energy using one of the vertical velocity, the roll velocity, and the pitch velocity.

5. The damper control system of claim 4,
    wherein the second deriving unit converts the vertical velocity, and the roll velocity, the pitch velocity into square forms, and then derives the impact energy using a highest velocity of the converted vertical, roll and pitch velocities.

6. The damper control system of claim 1,
    wherein in the road surface data of the estimating unit, a force reference value set so that a rough road level is divided depending on the impact force and an energy reference value set so that the rough road level is divided depending on the impact energy are pre-stored, and the state of the road surface is classified depending on whether the impact force reaches the force reference value and whether the impact energy reaches the energy reference value.

7. A damper control method according to rough road determination for a vehicle, the damper control method comprising:
    a detecting step of detecting, by a sensing unit, vehicle posture information depending on a vertical acceleration, a roll rate, and a pitch rate of a vehicle body in the vehicle;
    a first deriving step of receiving the vertical acceleration detected in the detecting step and deriving impact force generated in the vehicle body;
    a second deriving step of receiving the vertical acceleration, the roll rate, and the pitch rate detected in the detecting step and deriving impact energy generated in the vehicle body;
    an estimating step of pre-storing road surface data depending on impact force and impact energy and of estimating a state of a road surface depending on the received impact force and impact energy; and
    a controlling step of controlling, by a controller, a damper depending on the estimated state of the road surface.

8. The damper control method of claim 7,
    wherein in the first deriving step, the impact force is derived using the vertical acceleration and weight information.

9. The damper control method of claim 7,
    wherein in the second driving step, a vertical velocity is derived using the vertical acceleration, a roll velocity is derived using the roll rate, a pitch velocity is derived using the pitch rate, and the impact energy is derived using a highest velocity of the vertical velocity, the roll velocity, and the pitch velocity.

10. The damper control method of claim 7,
    wherein in the road surface data of the estimating step, a force reference value set so that a rough road level is divided depending on the impact force and an energy reference value set so that the rough road level is divided depending on the impact energy are pre-stored, and the state of the road surface is classified depending on whether the impact force reaches the force reference value and whether the impact energy reaches the energy reference value.

11. The damper control method of claim 7, wherein the sensing unit includes a 6D sensor configured to detect the vertical acceleration, the roll rate, and the pitch rate of the vehicle body.

\* \* \* \* \*